UNITED STATES PATENT OFFICE.

GEORGE F. GILLPATRICK, OF KANSAS CITY, MISSOURI, ASSIGNOR TO DEVOE & RAYNOLDS COMPANY, OF KANSAS CITY, MISSOURI, A CORPORATION OF MISSOURI.

PROCESS OF PRODUCING LAUNDRY BLUE.

1,224,737.     Specification of Letters Patent.     Patented May 1, 1917.

No Drawing.     Application filed September 15, 1916. Serial No. 120,230.

*To all whom it may concern:*

Be it known that I, GEORGE F. GILLPATRICK, a citizen of the United States, residing at Kansas City, in the county of Jackson and State of Missouri, have invented certain new and useful Improvements in Processes of Producing Laundry Blue; and I do declare the following to be a full, clear, and exact description of the invention, such as will enable others skilled in the art to which it appertains to make and use the same.

My invention relates to laundry blue, and the process of producing the same, and has for its principal object to provide an economical and easily obtainable laundry blue that is effective for general laundry uses.

It is also an object of the invention to provide a laundry blue with which fine and coarse linens may be treated simultaneously, without over or under treatment of either.

In accomplishing these objects, I utilize a dry complex furnace product commercially known as "ultra marine blue" in powdered or dry form.

This product, which is non-soluble in water, is placed in a double container, of double faced cotton, and suspended in a barrel or other vessel containing water, so that the color pigments of the product may filter through the container and color the water to produce liquid blue.

In actual practice I use two of the cotton sacks, one 9"x15" and one 10"x15", each open at one end. In the smaller sack I place five pounds of the dry ultra marine blue, and then place this smaller sack, containing the dry product, within the larger sack. The ends of the sacks are then tied securely and suspended in a barrel, so that the sacks hang about the middle of the barrel. I then fill the barrel with cold water and allow the same to stand a sufficient length of time for the non-soluble pigments to filter through the container and color the water.

When the bluing is to be used in a washer, two ordinary water buckets full, more or less, of this liquid blue are added for each load, the quantity being variable according to the richness of the blue.

As the blue is taken from the barrel, fresh water is run in to maintain the volume, and when the non-soluble pigments have been exhausted and the blue thinned, the container is removed and a new supply of the dry product added.

As the ultra-marine is confined in the double sack when placed in the water, the pigments must pass through both sacks before reaching the free liquid, so that they can be carried in suspension therein and eventually reach the articles being cleansed, the fine pigments percolating through the sacks, however, with sufficient freedom to properly condition the water although the double faced material of which the sacks are composed restrains the percolation to avoid the presence of an over quantity of the blue in the water.

Having thus described my invention what I claim as new therein, and desire to secure by Letters-Patent, is:—

The process of producing laundry blue, consisting of confining dry ultra-marine in a sack composed of double-faced cotton cloth, confining the said sack and its contents within a second sack of the same material and submerging said double container with its contents in a body of water, whereby pigments may percolate through the double container into the water in proper quantity to produce a liquid blue.

In testimony whereof I affix my signature.

GEORGE F. GILLPATRICK.

Copies of this patent may be obtained for five cents each, by addressing the "Commissioner of Patents, Washington, D. C."